US010591019B2

(12) United States Patent
Demeulenaere et al.

(10) Patent No.: US 10,591,019 B2
(45) Date of Patent: Mar. 17, 2020

(54) BALANCER SHAFT ASSEMBLIES

(71) Applicant: Ford Global Technologies, LLC, Dearborn, MI (US)

(72) Inventors: Xavier Demeulenaere, London (GB); Thomas Fisk, London (GB); Robert Davies, Braintree (GB); Alex Fu, London (GB); Mark Michel, Dartford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 1 day.

(21) Appl. No.: 15/897,878

(22) Filed: Feb. 15, 2018

(65) Prior Publication Data
US 2018/0231101 A1 Aug. 16, 2018

(30) Foreign Application Priority Data
Feb. 16, 2017 (GB) .................................. 1702528.9

(51) Int. Cl.
*F16F 15/26* (2006.01)
*F16C 3/18* (2006.01)
*F16C 17/10* (2006.01)
*F16C 33/04* (2006.01)
*F16C 17/02* (2006.01)

(52) U.S. Cl.
CPC .............. *F16F 15/267* (2013.01); *F16C 3/18* (2013.01); *F16C 17/02* (2013.01); *F16C 17/10* (2013.01); *F16C 33/046* (2013.01); *F16C 2326/05* (2013.01); *F16C 2360/22* (2013.01); *F16F 2230/04* (2013.01)

(58) Field of Classification Search
CPC ........ F16F 15/26; F16F 15/264; F16F 15/265; F16F 15/267; F16C 3/18; F16C 17/02; F16C 33/046; F16C 33/10
See application file for complete search history.

(56) References Cited

U.S. PATENT DOCUMENTS

| 4,523,553 A | 6/1985 | Backlund |
| 4,648,359 A * | 3/1987 | Ito ............................ F01L 1/02 123/192.2 |

(Continued)

FOREIGN PATENT DOCUMENTS

| CN | 201610775 U | 10/2010 |
| DE | 10355478 A1 | 7/2005 |

(Continued)

OTHER PUBLICATIONS

European Patent Office, Extended European Search Report Issued in Application No. 18150063.8, dated Jul. 5, 2018, Germany, 9 pages.

(Continued)

*Primary Examiner* — Thomas C Diaz
(74) *Attorney, Agent, or Firm* — Geoffrey Brumbaugh; McCoy Russell LLP

(57) ABSTRACT

Methods and systems are provided for balancer shaft assemblies featuring bearing caps. In one example, a system may include a bearing cap connected to a housing surrounding a balancer shaft. The bearing cap may have faces which contact components of the balancer shaft. This contact may prevent movement of the balancer shaft in a particular direction.

20 Claims, 4 Drawing Sheets

(56) References Cited

U.S. PATENT DOCUMENTS

| | | | | |
|---|---|---|---|---|
| 4,693,139 | A | * 9/1987 | Mukai | B23D 31/003 |
| | | | | 29/888.09 |
| 5,727,885 | A | * 3/1998 | Ono | F16C 9/04 |
| | | | | 384/294 |
| 9,068,626 | B2 | * 6/2015 | Saito | F16H 55/18 |
| 2007/0081750 | A1 | 4/2007 | Neto | |
| 2008/0202463 | A1 | 8/2008 | Marzy et al. | |

FOREIGN PATENT DOCUMENTS

| | | | |
|---|---|---|---|
| DE | 102009032736 A1 | 1/2011 | |
| DE | 102011117942 A1 | 5/2013 | |
| EP | 1304450 A2 | 4/2003 | |
| EP | 3056751 A1 | 8/2016 | |
| GB | 2533445 A | 6/2016 | |
| GB | 2537200 A | 10/2016 | |
| GB | 2539901 A | 1/2017 | |
| JP | 2000352422 A | * 12/2000 | F16F 15/267 |
| JP | 2000352422 A | 12/2000 | |
| JP | 2006002852 A | 1/2006 | |
| JP | 2010190407 A | 9/2010 | |

OTHER PUBLICATIONS

Great Britain Patent Office, Combined Search and Examination Report under Sections 17 and 18(3) Issued in Application No. GB1702528.9, dated Jul. 24, 2017, United Kingdom, 7 pages.

* cited by examiner

BALANCER SHAFT ASSEMBLIES

CROSS REFERENCE TO RELATED APPLICATION

This application claims priority to Great Britain Patent Application No. 1702528.9, filed Feb. 16, 2017. The entire contents of the above-referenced application are hereby incorporated by reference in its entirety for all purposes.

FIELD

The present description relates generally to methods and systems for balancer shafts for an internal combustion engine of a vehicle, and in particular to thrust control of balancer shafts.

BACKGROUND/SUMMARY

A modern internal combustion engine include many moving parts, such as reciprocating and rotating parts, which may cause unbalanced forces to be exerted on the engine. It is generally desirable to cancel or balance these forces where possible to extend the life of the engine components and to improve the comfort of users of the vehicle.

Balancing of the engine forces is often achieved with one or more balancer shafts which comprise eccentrically weighted components. The eccentrically weighted components are designed to apply equal and opposite forces to those exerted on the engine by other components when the balancer shaft is rotated. Thus, the net reciprocating forces applied to the engine during operation may be substantially reduced.

Axial forces may arise in balancer shafts due to eccentric weighting. The forces cause the balancer shaft to shift in an axial direction. Axial forces can also be applied to the balancer shaft by the driving mechanism of the shaft, such as helical gears. In order to reduce or prevent this movement, balancer shafts utilize thrust control.

Conventional methods of controlling the axial movement of balancer shafts include the use of thrust washers and radial grooves. Thrust washers are positioned between two components of a balancer shaft assembly such that potential axial movement distance is reduced. Thrust washers add weight, dimension, cost, and manufacturing steps to balancer shaft assemblies. Radial grooves can also be used in which part of the balancer shaft journal fits within the radial groove such that axial movement is limited. This approach requires larger journal surfaces, additional weight, and manufacturing of the balancer shaft. In view of the numerous constraints applied to the design of modern internal combustion engines, it will be understood that improvements in the field of thrust control of balancer shafts are desirable.

However, the inventors herein have recognized potential issues with conventional systems. As an example, there are numerous conflicting packaging constraints in the lower end of the engine which do not permit the use of conventional thrust control features. Thus, the combining of the thrust control into the bearing cap provides a space-saving, weight, and simplicity advantage.

In one example, the issues described above may be addressed by a system for a balancer shaft assembly for an internal combustion engine comprising: a bearing cap and a balancer shaft configured to rotate within a bearing comprising the bearing cap. The bearing cap comprises first and second thrust control faces on opposing sides of the bearing cap. The first and second thrust control faces form the extreme axial faces of the bearing cap. The balancer shaft comprises first and second components, at least one of the first and second components being operable to balance the internal combustion engine. The first and second components are arranged on the opposing sides of the bearing cap to thereby constrain axial movement of the balancer shaft. In this way, the thrust control faces control axial movement of the balancer shaft in a simple, compact, and low weight manner.

As one example, a bearing includes a bearing cap and bearing seat. The bearing cap includes two thrust control faces which extend perpendicular to the balancer shaft. On opposing sides of the bearing cap a first and second component are located. Thus, axial movement of the balancer shaft will cause one of the first or second components to contact one of the thrust control faces. This contact will limit the axial movement of the balancer shaft.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 1-6 are shown approximately to scale.

DETAILED DESCRIPTION

Figure 1:
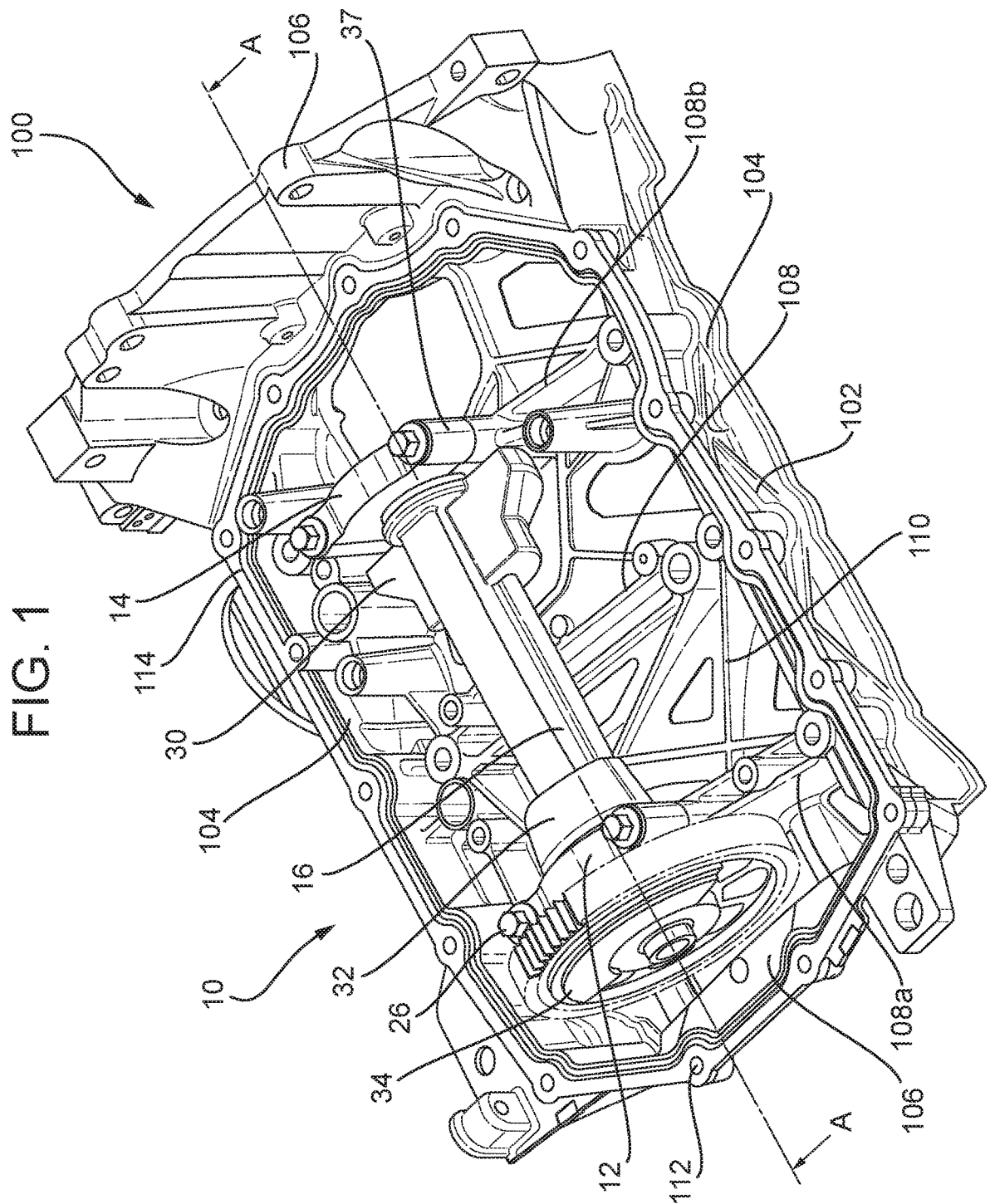
FIG. 1 depicts a balancer shaft assembly.

The following description relates to systems and methods for balancer shaft assemblies. The following description will include various embodiment of balancer shaft assemblies. The figures provided will depict embodiments of the balancer shaft assemblies and elements such as the thrust control faces. Further elements such as the contact of the thrust control faces with other component in order to limit axial movement of the balancer shaft will also be described. Variations of embodiments such as one including a bearing cap wider than a bearing will also be described. The description will provide an understanding of the concepts and components of the balancer shaft assemblies.

Embodiments have the balancer shaft assemblies disclosed may be used with a wide variety of internal combustion engines. Embodiments may be used in hybrid engines, engines featuring supercharging, engines featuring cylinder deactivation and further types of engines. These engines may also be used in a wide variety of vehicles such as cars, trucks, boats, airplanes, or other types of vehicles. Embodiments of the balancer shaft assemblies are not limited to use in vehicles.

According to an aspect of the present disclosure, there is provided an internal combustion engine comprising a balancer shaft assembly as hereinbefore described. A casing of the engine, for example a ladderframe of the engine may comprise the balancer shaft assembly.

Embodiments of the present application include multiple balancer shafts. Each balancer shaft may comprise first and second bearing caps of the type hereinbefore described.

It should be understood that a balancer shaft is a shaft for rotation within an internal combustion engine to balance forces generated by the movement of other components of the engine. In some examples, two balancer shafts are provided. In such cases, the balancer shafts may rotate in opposite directions to cancel out lateral forces created by their rotation.

The balancer shaft or shafts may comprise an eccentric weight. The eccentric weight may be a mass which is deliberately asymmetric about the circumference of the shaft such that when the shaft rotates in isolation, a force is exerted in the radial direction. The eccentric weight may be formed as a separate component and then attached to the balancer shaft, or the weight may be formed integrally as part of the shaft, for example by casting. The shaft or shafts may be arranged to rotate within one or more bearings. The bearings may be formed in two parts, with a bearing seat portion forming a part of the bearing surface, and a bearing cap fixable to the bearing seat completing the bearing surface. The bearing surface is positioned around the balancer shaft to secure the balancer shaft to the engine in a freely-rotatable manner. The bearing cap may be secured to the bearing seat by temporary fixings, such as bolts or screws, to thereby facilitate removal of the shaft if required. The bearing seat may an integral or separate component.

The thrust control faces of the bearing cap may extend about an arc of a circumference of the balancer shaft, for example around a 180 degree arc. The thrust control faces of the bearing cap may comprise a point or line face for contact with the first or second component. The thrust control faces of the bearing cap may be formed in a plane substantially perpendicular to a longitudinal or rotation axis of the balancer shaft. In some examples, the bearing seat may comprise also comprise a thrust control face which forms a substantially continuous thrust control face when combined with the thrust control face of the bearing cap.

The first and second components may be operative components. That is, it should be understood that the first and second components of the present disclosure may be components forming a part of the balancer shaft which have a primary function which is not related to effecting thrust control of the shaft.

At least one of the first and second components may comprise a component thrust control face for sliding contact with one of the first and second thrust control faces of the bearing cap. The thrust control face of the first or second component may be formed continuously around an entire circumference of the balancer shaft. The thrust control face may also be formed around a portion of the circumference.

At least one of the first and second components may be an eccentric balancing weight. The eccentric balancing weight may comprise a weight thrust control face adapted for sliding contact with one of the first and second thrust control faces of the bearing cap.

At least one of the first and second components may be a driven gear of the balancer shaft or a driving gear of the balancer shaft. The driven gear or driving gear may comprise a gear thrust control face adapted for sliding contact with one of the first and second thrust control faces of the bearing cap.

At least one of the first and second thrust control faces of the bearing cap may comprise a groove. Any of the thrust control faces of the bearing cap, the first or second component, the eccentric weight, or the driven or driving gear may comprise a groove. The groove may be for improving lubrication of the thrust control faces.

At least one of the first and second thrust control faces comprises a plurality of grooves. More generally, any of the thrust control faces herein described may comprise a plurality of grooves. A groove may be a substantially radially extending groove. The groove may extend across a surface of the thrust control face.

Any of the thrust control faces herein described may comprise radially inner or innermost edge and a radially outer or outermost edge. The groove or grooves may extend from a radially inner or innermost most edge of the thrust control face. The groove or grooves may extend partially across the thrust control face. That is, the groove may extend from the radially inner or innermost edge of the thrust control face radially, but not so far as to reach the radially outer or outermost edge. Conversely, the groove may extend radially inwards from the radially outer or outermost edge, but not so far as to reach the radially inner or innermost edge.

The groove may extend across the thrust control face to a radially outer or outermost edge of the thrust control face. That is, the groove may extend radially across an entire radial width of the thrust control face from a radially inner face to a radially outer face.

The thrust control of the balancer shaft may be provided exclusively by the thrust control faces of the bearing cap. That is, the axial movement of the balancer shaft may be influenced by the bearing cap. It should be understood that when the thrust face of one of the first and second components travels in the axial direction and comes into contact with one of the first and second thrust control faces of the bearing cap, the component—and thus the balancer shaft—may move no further in that axial direction. In some embodiments, the balancer shaft rotates in a plurality of bearings but only one bearing cap includes thrust control faces. In further embodiments, a bearing cap may have a thrust control face preventing movement in one direction while another bearing includes a thrust control face in another direction.

The bearing may further comprise a bearing seat. The bearing seat and the bearing cap may, in combination, form the bearing. The bearing may comprise a bearing surface for contact with a journal portion of the balancer shaft. Each of the bearing seat and the bearing cap may comprise a partial bearing surface which, in combination, form the bearing surface. The bearing seat may be formed integrally or as a separate component to a casing portion of an engine, such as a ladderframe of an engine.

The thrust control faces of the bearing cap may overhang a support structure which receives the bearing cap. The support structure may be the bearing seat. The bearing cap may have a width in an axial direction of the balancer shaft. The bearing cap width may be a width between the thrust control faces of the bearing cap. The bearing seat may have a width in the axial direction of the balancer shaft. The bearing cap width may be greater than the bearing seat width. Thus, thrust control wear may occur only on the bearing cap and not on the bearing seat. Thus, the wear may be concentrated on an easily replaceable cap, rather than the seat which may be more difficult to replace, for example if it forms part of the engine casing.

The balancer shaft assembly may further comprise a second bearing cap and a second balancer shaft, the second balancer shaft configured to rotate in an opposite direction to a rotation direction of the balancer shaft.

It should be understood that balancer shaft assemblies may comprise first and second balancer shafts which rotate in opposite directions to cancel out transverse or lateral forces caused by the rotating weights on the shafts. Each of the balancer shafts may comprise a driven gear for being driven to rotate the balancer shaft. The driven gear may be rotated by an external source, such as a linkage to the output shaft of the engine or other source. One of the balancer shafts may comprise a driving gear for driving the driven gear of other balancer shaft.

Figure 2:
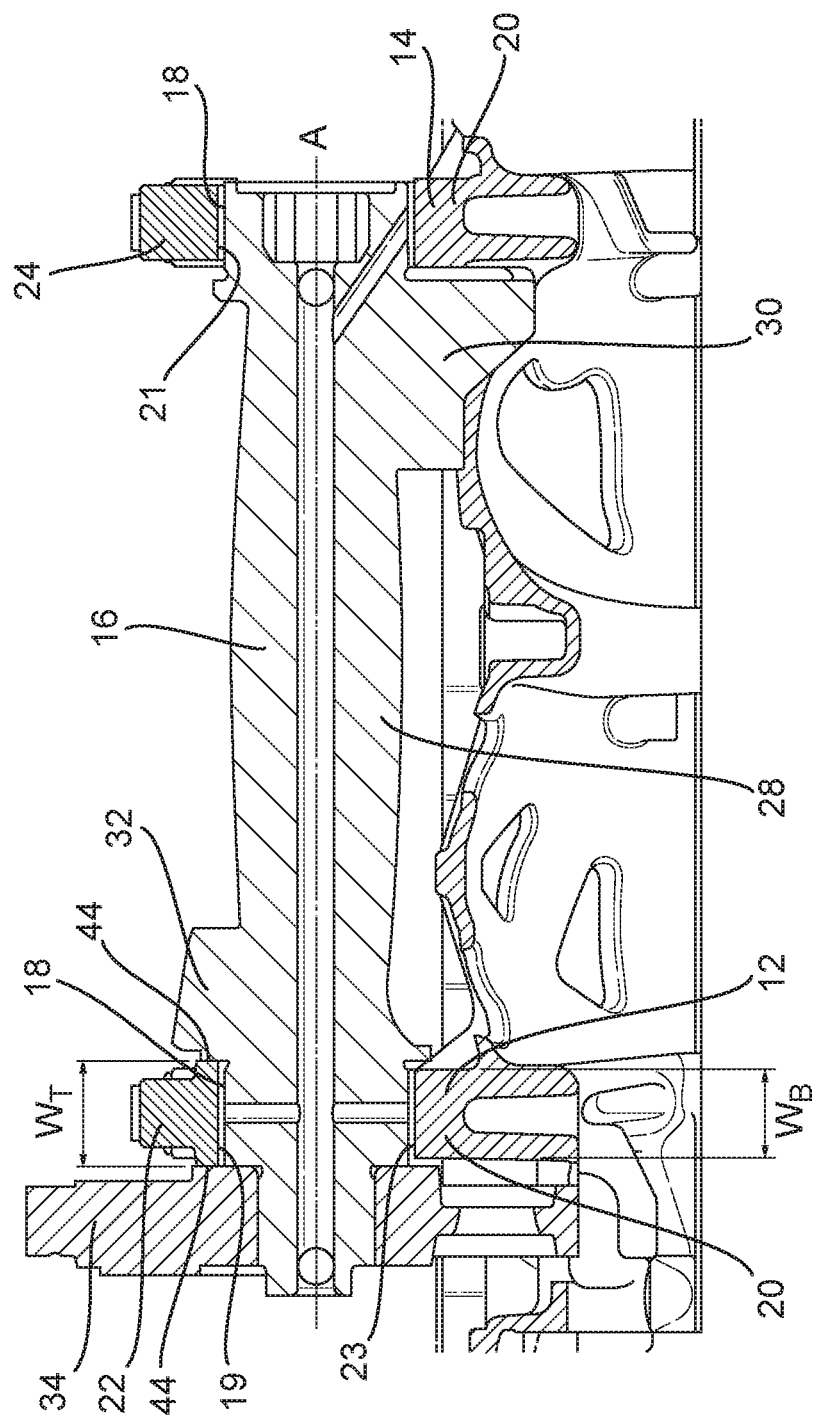
FIG. 2 depicts a cross-sectional view of the balancer shaft assembly of FIG. 1.

FIGS. 1 and 2 show a balancer shaft assembly 10 in an internal combustion engine 100. The engine 100 is partially cut-away to expose a ladderframe assembly 102 of the engine casing for supporting the balancer shaft assembly 10. It should be understood that alternative configurations of an engine 100 are available having different arrangements for supporting the balancer shaft assembly 10.

The ladderframe assembly 102 comprises a pair of opposing side rails 104, and a pair of opposing end rails 106 forming substantially rectangular frame. A plurality of cross members 108 extend between the side rails 104 to form a substantially ladder-shaped frame. The engine 100 has various reinforcement struts 110 extending between the rails 104,106 and the cross members 108 to provide additional strength to the ladderframe 102.

In use, the ladderframe 102 is connected to an upper portion of the engine 100 (not shown). Various through-holes 112 are provided about the ladderframe 102 for bolting the ladderframe to the engine casing. A gasket 114 extends around the rail 104,106 to form a seal between the ladderframe 102 and the remainder of the engine casing.

Two of the cross-members 108a and 108b are provided proximate and substantially parallel to the end rails 106. Each of the cross members 108a, b comprise a bearing 12 and 14 respectively for rotatably mounting a balancer shaft 16.

The balancer shaft 16 has numerous components provided thereon for exerting balancing forces and for facilitating rotation of the balancer shaft 16. In the illustrated arrangement, balancer shaft 16 comprises an elongate shaft portion 28 having a first eccentric weight 30 at a first end thereof, and a second, smaller eccentric weight 32 at a second end thereof. The weights 30, 32 are examples of components which are operable to balance the internal combustion engine. The eccentric weights 30, 32 respectively are located between the bearings 12, 14 when the balancer shaft 16 is secured in the bearings. The eccentric weights 30, 32 exert eccentric forces on the engine when the balancer shaft 16 is rotated, which can be used to balance other forces in the engine as is known in the art. The eccentric weights 30, 32 may be integrally formed on the balancer shaft 16, for example by casting, or may be separate components which are fixed to the balancer shaft, for example by an interference fit, or the like.

The journal surfaces 18 are the portions of the balancer shaft which make contact with the bearing surfaces 19, 21 of the bearings 12, 14. The journals surfaces 18 are smooth, cylindrical portions of the shaft 16 which have an outer diameter substantially similar to or fractionally smaller than an inner diameter of the bearing surfaces 19, 21, such that the balancer shaft 16 can freely rotate within and be supported by the bearings 12, 14 on the journal surfaces.

The balancer shaft 16 further comprises a driven gear 34 arranged axial to the eccentric weight 32 and the journal surface 18. The driven gear 34 is eccentrically weighted and formed as a separate component to the balancer shaft 16, but is fixed to the balancer shaft 16 by an interference fit or the like. The driven gear 34 is a further example of a component operable to balance the internal combustion engine. The driven gear 34, in use, meshes with a driving mechanism (not shown) for rotating the balancer shaft 16. The driving mechanism may be, for example a gear train from the crankshaft of the engine 100. Components other than gears and weights may also be used with the balancer shaft assemblies.

The bearings 12, 14 are provided approximately at a mid-way point along the cross members 108a, 108b, such that the balancer shaft 16 is arranged parallel to and substantially equidistant from the side rails 104 of the ladderframe 102. In this way, the balancer shaft 16 is provided along an axial centerline of the engine. The axis A of the balancer shaft may be parallel to an axis of the crankshaft of the engine 100 (not shown). The bearings 12 and 14 are lubricated plain journal bearings. Other types of bearings may also be used. The balancer shaft 16 comprises journal surfaces 18 (see FIG. 2) which rotate within the bearings 12 and 14 against bearing surfaces 19 and 21 respectively of the bearings 12 and 14. A lubricant, such as oil, is provided between the bearing surface pairs 18, 19 and 18, 21 to facilitate smooth and substantially free rotation of the balancer shaft 16 with respect to the ladderframe 102. In an alternative example, a bearing shell may be provided between the bearing surfaces 19, 21 and the journal surfaces 18.

Each of the bearings 12, 14 is formed of a bearing seat 20 and a bearing cap. For bearing 12, the bearing cap is a thrust control bearing cap 22 and, for bearing 14, the bearing cap is a conventional bearing cap 24. It should be understood that bearing cap 24 of bearing 14 could also be a thrust control bearing cap if desired. Both of the bearing seats 20 are substantially similar. The seats 20 each comprise a semi-cylindrical recess which forms a seat bearing surface 23 having a radius substantially equal or slightly larger than an outer radius of the journal surface 18 of the balancer shaft 16. The seat bearing surface 23 forms half of the circumference or a 180 degree arc of the bearing surfaces 19, 21. The other half or 180 degrees of the bearing surfaces 19, 21 is formed by the bearing caps 22, 24 as will be discussed below. The bearing seat 20 has a width WB which is less than a width of the journal surface 18 of the balancer shaft 16. Furthermore, the width WB is also less than a width WT of the bearing cap 22 which will be discussed in more detail below. As the width of the bearing seat 20 is less than the width of the bearing cap 22, the bearing cap may be subject to all of the wear relating to thrust control of the balancer shaft 16. Therefore, wear is concentrated on a relatively small and easily replaceable component, rather than an integral part of the ladderframe, which may be more expensive and difficult to replace. The bearing seats 20 comprise a threaded hole (not shown) arranged either side thereof for receiving a bolt 26 for securing the bearing cap 22, 24 to the bearing seat.

The bearing cap 24 of bearing 14 comprises a semi-cylindrical recess for forming the other half of the bearing surface 21. The radially innermost surface of the cap 24 which forms a portion of the bearing surface 21 in a similar manner to the bearing seat 20. The bearing cap 24 comprises a pair of cap mounts 37 having a pair of through bores (not shown) arranged either side of the cap for receiving the bolts 26 for securing the bearing cap 24 to the bearing seat 20 of the bearing 14 to form the complete bearing surface 21 about one of the journal surfaces 18 of the balancer shaft 16.

The balancing forces exerted by the journal surface 18 of the rotating balancer shaft 16 are reacted by the bearing surface 21 of the bearing 14 to transfer the balancing forces to the engine 100. As the bearing surface 21 is formed in two parts by the bearing seat 20 and bearing cap 24, it will be understood that a small break or gap is present in the bearing surface 21 where the seat 20 and cap 24 meet. However, it will also be understood that manufacturing tolerances used when producing the seat and cap are sufficiently accurate to minimize any such gap such that it does not have a material effect on the smooth operation of the bearing 14. Thus, it should be understood that the bearing surface 21 is a substantially continuous cylindrical surface despite any small gap being present. The same applies to the bearing 12 and the bearing surface 19, which is formed in two parts by the bearing seat 20 and the bearing cap 22.

Figure 3:
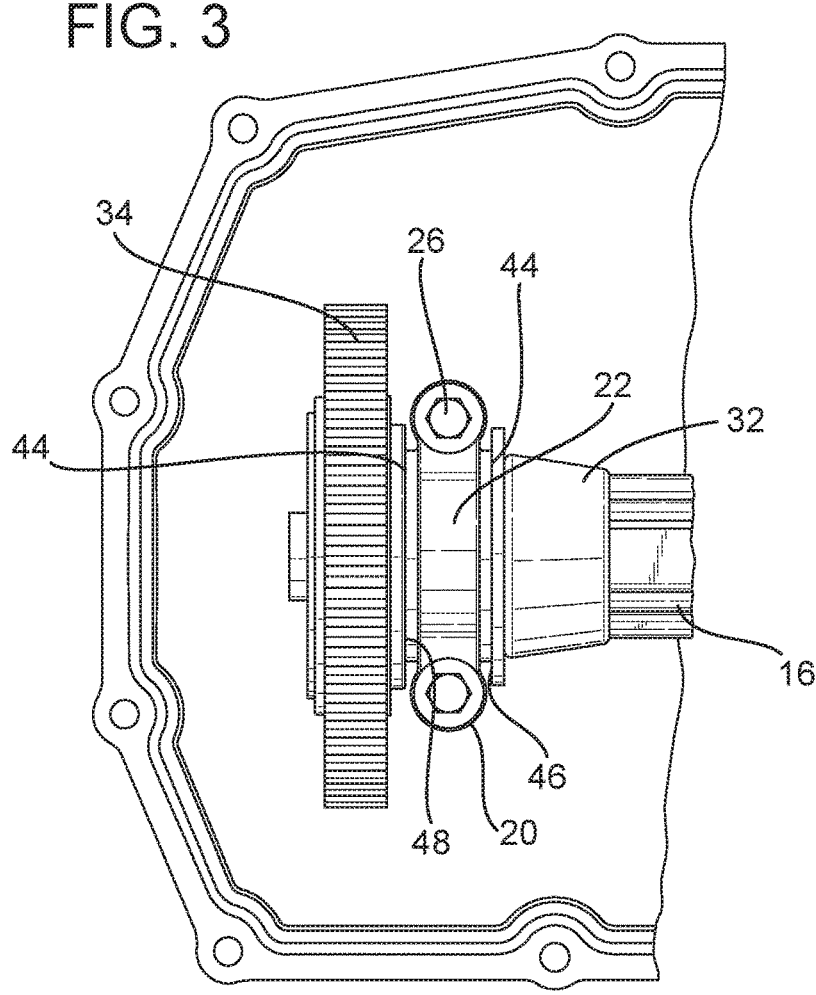
FIG. 3 depicts a plan view of a portion of the balancer shaft assembly of FIG. 1.
Figure 4:
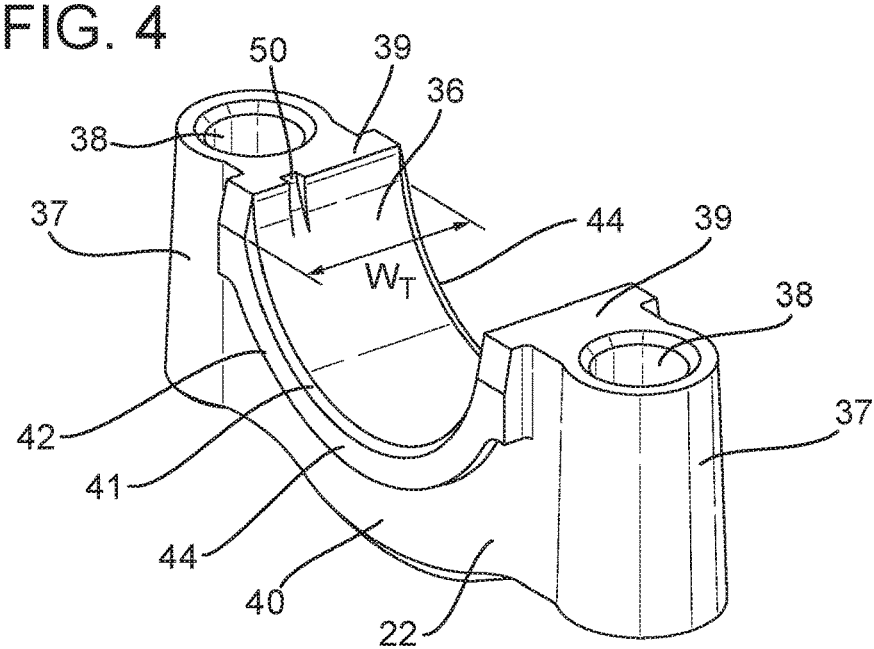
FIG. 4 depicts a perspective view of a bearing cap.

A first embodiment of the thrust control bearing cap 22 is illustrated in more detail in FIGS. 2, 3, and 4. This embodiment features thrust control bearing cap 22 is formed as a unitary piece by casting, sintering, or the like. Further machining operations may be performed on the thrust control bearing cap after forming to improve the quality or finish of various features, such as the semi-cylindrical cap bearing surface 36, which forms a portion of the bearing surface 19 of the bearing 12. Embodiments may use machining operations to prepare the bearing cap 22 for direct contact with journal surface 18.

The thrust control bearing cap 22 comprises first and second spaced-apart cap mounts 37. The cap mounts 37 are substantially cylindrical member having bolt-receiving bores 38 formed therein. When the cap 22 is fixed to the bearing seat 20, the bolts 26 extend through the bores 38 and are secured in threaded holes provided in the seat 20 as discussed above. The cap mounts 37 are connected by structural bridge 40 and a bearing flange 42 formed therebetween.

FIG. 4 shows an embodiment of bearing cap 22. The structural bridge 40 is formed radially outwards of the bearing flange 42. Both the bridge 40 and the flange 42 have a substantially arcuate shape with a center of curvature on the axis A of the balancer shaft 16 when the cap 22 is secured to the seat 20. The radially innermost surface of the bearing flange 42 is a cap bearing surface 36 which forms a portion, in this case a 180 degree arc, of the bearing surface 19 of the bearing 12. The inner radius of the cap bearing surface 36, and thus the bearing surface 19, is substantially equal or slightly larger than an outer radius of the journal surface 18 of the balancer shaft 16.

The bearing flange 42 comprises thrust control faces 44 on the extreme faces in the axial direction thereof. The width of the bridge 40 in an axial direction of the bearing 12 is narrower than a width WT of the bearing flange 42 between the thrust control faces 44.

A wedge-shaped slot 50 having a reducing depth 50 is formed into the cap bearing surface 36 at one end of the bearing flange 42. The slot 50 may be used to locate a bearing shell, if provided, properly in position. In such examples, there may be a complimentary protrusion on the shell which is located in the slot 50. Alternatively, in other examples, a concentric groove may run around the circumference of the bearing surface 19 or of a bearing shell, if provided, for feeding lubricating fluid to the bearing at high pressure.

In some embodiments, a bearing shell may only extend in an axial direction. In comparison to a bearing shell, a thrust washer has faces which extend radially which may be positioned between components. Embodiments of the application include thrust control faces on the bearing for contacting balancer shaft components. Thus the thrust control faces on the bearings disclosed herein perform function conventionally performed by thrust washers.

Additionally, a chamfered edge surface 41 is formed between the cap bearing surface 36 and each of the thrust control faces 44 about their entire arc. The chamfer of the surface encourages lubricating fluid from the bearing surface 21 to travel to the thrust control faces 44 to improve their lubrication.

The end surface of the mounts 37 and the ends of the arced bearing flange 42 form two planar engagement surfaces 39 for contact with corresponding surfaces of the bearing seat 20 (not shown) when the cap 22 is secured to the seat 20.

As can be seen in the cross section of FIG. 2, the thrust control faces 44 of the bearing cap 22 form the extreme faces of the bearing cap 22, and of the bearing 12, in the axial direction A of the balancer shaft 16. The thrust control faces 44 of bearing cap 22 are smooth radially extending surfaces formed in a plane perpendicular to the axis A. The axis A is a longitudinal axis of the balancer shaft 16. Thus, any component of the balancer shaft 16 which moves in an axial direction towards the bearing 12 will come into contact with either of the thrust control faces 44 before any other part of the bearing 12. Accordingly, the thrust control faces 44 can be used for thrust control of the entire balancer shaft 16 as will be further described below.

As can be seen in FIGS. 2 and 3, eccentric weight 32 and the driven gear 34 are arranged either side of the bearing 12 and the bearing cap 22. The thrust control faces 44 are arranged on opposing sides of the bearing cap 22 facing the eccentric weight 32 and the driven gear 34. Other types of components may also be used with the disclosed balancer shaft assemblies.

The eccentric weight 32 includes a radially extending thrust face 46 formed adjacent and perpendicular to the journal surface 18. The weight thrust surface 46 is formed 360 degrees about the shaft 16 and faces one of the thrust faces 44 of the bearing cap 22 when the balancer shaft 16 is arranged within the bearing 12. The weight thrust surface 46 forms an extreme face in the axial direction of the eccentric weight 32 in the axial direction A towards the bearing 12.

The driven gear 34 comprises a radially extending thrust face 48, which is formed adjacent and perpendicular to journal surface 18. The gear thrust surface 48 is also formed about 360 degrees of the shaft 16 and faces a thrust face 44 of the bearing cap 22. The driven gear 34 faces a thrust face 44 on an opposite side of bearing cap 22 to the eccentric weight 32. The gear thrust surface 48 forms an extreme face in the axial direction of the driven gear 34 in the axial direction A towards the bearing 12.

The weight and gear thrust faces 46, 48 can be said to define the axial limits of the journal surface 18. In use, the bearing cap 22 is arranged between the weight and gear thrust faces 46, 48. The thrust control faces 44, as discussed above, are spaced apart by an axial distance WT, which is also equivalent to the width of the cap 22. The weight and gear thrust faces 46, 48 are spaced apart by an axial distance WX (not shown) which may be substantially equal to WT or slightly larger than WT. If WX is equal to WT, then the thrust control faces 44 will be simultaneously in sliding contact with the weight and gear thrust faces 46, 48, whereas if WX is larger than WT, a small gap will be present between the thrust control faces 44 and the weight and gear thrust faces 46, 48.

It should be understood that if the distance between the weight and gear thrust faces 46, 48 is substantially equal to the distance WT, then there will be little or no axial movement of the balancer shaft 16 relative to the bearing 12, as the shaft 16 will be constrained by the contact between the thrust control faces 44 and the weight and gear thrust faces 46, 48. Alternatively, in the case where the distance between the weight and gear thrust faces 46, 48 is slightly larger than the distance WT, then there will be room for the balancer shaft 16 to move axially relative to the bearing 12 by a distance WD equal to the difference between WT and WX. However, the shaft 16 will be constrained and prevented from moving further than WD due to contact between the thrust control faces 44 and the weight and gear thrust faces 46, 48 if the shaft 16 moves more than WD in either axial direction along axis A.

Accordingly, the gap distance WD can be carefully controlled so as to provide clearance between the thrust control faces 44 and the weight and gear thrust faces 46, 48 to permit relatively free and uninhibited rotation of the balancer shaft 16, while preventing significant axial movement of the shaft 16. This control of the axial movement of the balancer shaft 16 relative to the bearing 12 is known as thrust control.

As the thrust control of the shaft 16 may only be used in one place, the bearing cap 22 features the thrust control faces 44, while the other bearing cap 24 is narrow enough to permit ample clearance between itself and the components of the balancer shaft 16 arranged adjacent thereto. It will also be understood that the thrust control faces 44 do not need to be formed around an entire circumference or 360 degrees of the shaft, so the thrust control faces 44 may be formed on the bearing cap 22 and not on the bearing seat 20. Thus, the bearing seat 20 may be of a narrower width WB than the bearing cap width WT.

Furthermore, although the thrust control faces of the arrangement of FIGS. 2 to 6 extends around 180 degrees of the shaft, it will be understood that the surface may extend more or less than this distance. Furthermore, it should be understood that the thrust control faces 44 on the bearing cap 22 may even be infinitesimally small area surfaces, such as a line or point formed at an extreme location in the axial direction of the bearing cap, and still provide the same technical effect of effecting thrust control using the bearing cap. In further embodiments, bearing cap 22 and bearing cap 24 may each include a thrust face such that axial movement is constrained in both directions.

A chamfer is provided between surfaces 44 and 39. This chamber can avoid the edges of the thrust control faces 44 having a sharp edge against the rotating weight and gear thrust faces 46, 48, which might otherwise increase wear on the opposite surfaces. The chamfer also provides a wedge area where oil can be trapped between surfaces 46, 48 and the bearing cap 22, which may help create a consistent oil film between the two components.

Thus, a balancer shaft assembly according to the present disclosure provides the dual functions of bearing and thrust control without separate dedicated components. This may enable the balancer shaft assembly to be packaged smaller than would otherwise be possible with conventional thrust control systems such as thrust washers and radial grooves for journals portions.

Figure 5:
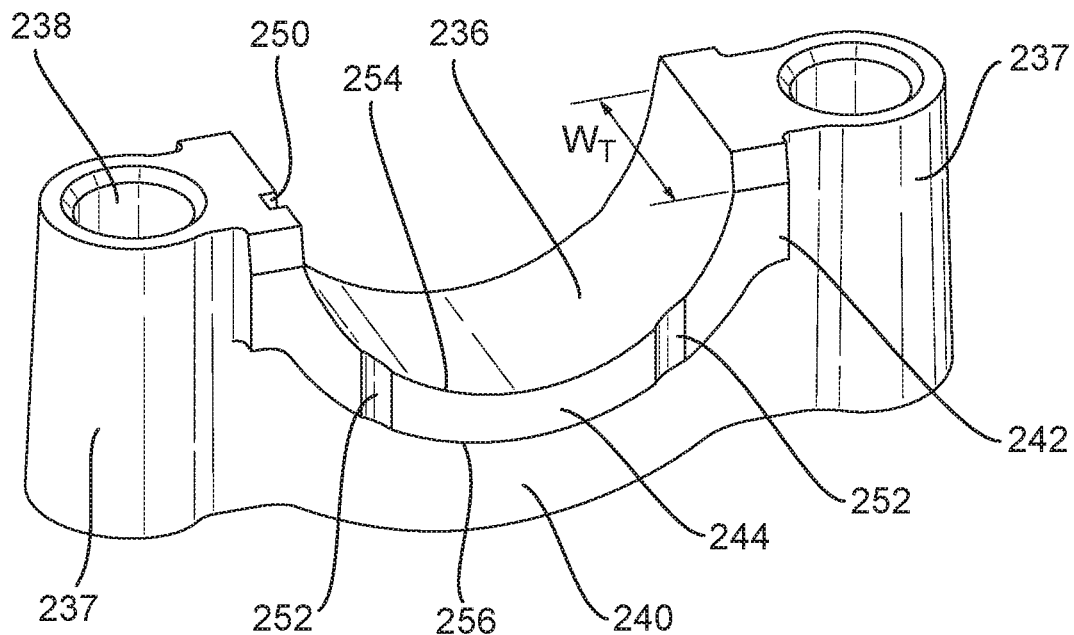
FIG. 5 depicts a perspective view of an alternative bearing cap.
Figure 6:
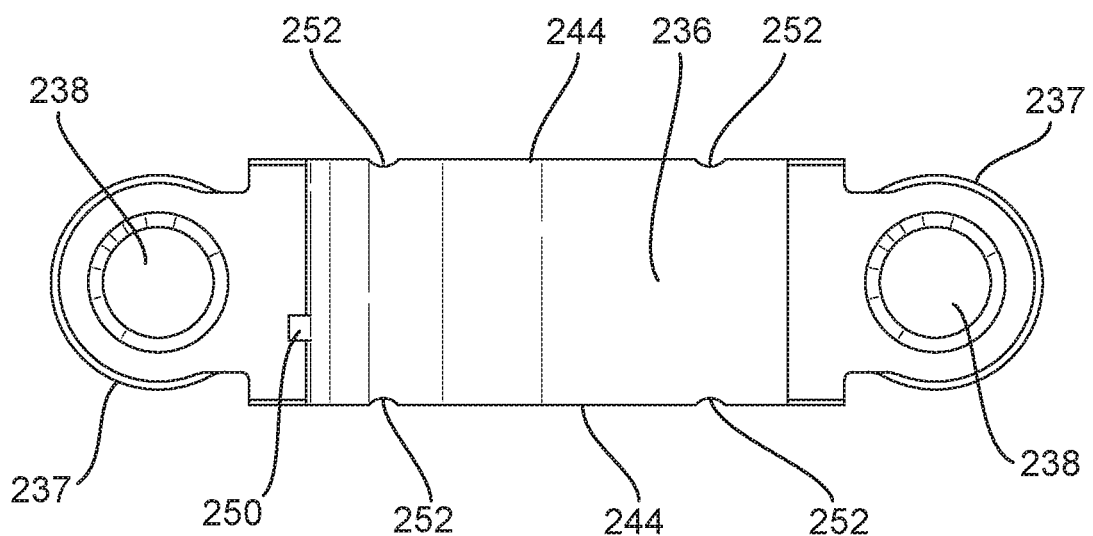
FIG. 6 depicts a plan view of the bearing cap of FIG. 5.

A second example of a bearing cap 222 for bearing 12 is illustrated in FIGS. 5 and 6. The bearing cap 22 has a form similar to the bearing cap 22 and like features of the cap 222 to the cap 22 are illustrated with numerals separated from those of FIG. 4 by two hundred.

The bearing cap 222 differs from the cap 22 in that it features a plurality of grooves 252 formed in the thrust control faces 244. Each groove 252 extends from an inner radial edge 254 of the thrust control face 244 to the outer radial edge 256 of the thrust control face 244. However, it will be understood that the grooves 252 may alternatively extend from the inner radial edge 254 across the surface, but end radially inwards of the outer radial surface 256.

In this example, two grooves 252 are provided on each thrust control face 244 of the bearing cap 222, each being equally spaced between a center line of the bearing flange 242 and from the bearing cap mounts 237. It should be understood that in other examples, one, three, four, five, or more grooves may be provided. Furthermore, different spacing between the grooves 252 may be provided.

As shown in FIGS. 5 and 6, the grooves 252 are formed as recesses or slots in the surface 244. The grooves 252 form a curved or smoothed recessed profile having rounded or chamfered edges such that there are no sharp edges present at an interface between the grooves 252 and the remainder of the thrust control face 244 on which the grooves are formed.

When seen in the view of FIG. 6, the grooves 252 are parallel to the bores 238. It should be understood that although the grooves 252 of the illustrated example do not extend exactly along a radial direction with respect to the shaft 16, they may still be considered to be substantially radially extending. That is, they extend from a radially inner position to a radially outer position across the thrust control face 244. In other examples, the grooves 252 may extend along an exact radial direction. Still further examples may include groove 252 with other orientations.

The grooves 252 improve lubrication of the thrust control faces 244. Lubrication fluid, such as oil, can travel into and along the grooves 252 from the cap bearing surface 236 with less resistance. When the grooves 252 are filled with lubricating fluid, the fluid directly contacts the thrust face of the adjacent component, such as the weight thrust face 46, as it rotates past the grooves 252. The fluid can then form a film on the thrust face of the component as it is rotating past the grooves 252, whereby improving lubrication between the entire thrust control face 244 and the thrust face of the adjacent component, such as the weight 32 or the gear 34.

Electric machine 52 receives electrical power from a traction battery 58 to provide torque to vehicle wheels 55. Electric machine 52 may also be operated as a generator to provide electrical power to charge battery 58, for example during a braking operation.

FIGS. 1-6 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A balancer shaft assembly for an internal combustion engine comprising:
a bearing cap positioned on a single bearing seat; and
a balancer shaft configured to rotate within a bearing comprising the bearing cap,
the bearing cap comprising first and second thrust control faces on opposing sides of the bearing cap, and the first and second thrust control faces form terminal faces of the bearing cap in an axial direction and define a maximum width of the bearing cap,
wherein the balancer shaft comprises first and second components, and the first and second components are arranged on opposing sides of the terminal faces of the bearing cap.

2. The balancer shaft assembly according to claim 1, wherein at least one of the first and second components is an eccentric balancing weight and the eccentric balancing weight includes a weight thrust control face that forms sliding contact with one of the first and second thrust control faces of the bearing cap.

3. The balancer shaft assembly according to claim 2, wherein the other of the first and second components is a gear and the gear includes a gear thrust control face adapted for sliding contact with one of the first and second thrust control faces of the bearing cap.

4. The balancer shaft assembly according to claim 1, wherein at least one of the first and second thrust control faces comprises a groove.

5. The balancer shaft assembly according to claim 4, wherein the groove extends in a radial direction.

6. The balancer shaft assembly according to claim 5, wherein the groove extends across the thrust control face to a radially outermost edge of the thrust control face.

7. The balancer shaft assembly according to claim 1, wherein the bearing cap comprises a structural bridge extending between two through holes.

8. The balancer shaft assembly according to claim 7, wherein a width of the bearing cap between the terminal faces in an axial direction of the balancer shaft is greater than a width of a bearing seat in the axial direction.

9. The balancer shaft assembly according to claim 1, further comprising a second bearing and a second balancer shaft, the second balancer shaft configured to rotate in an opposite direction to a rotation direction of the balancer shaft.

10. A balancer shaft assembly for an internal combustion engine comprising:
a bearing including a bearing cap connected to a single bearing seat, wherein the bearing cap includes bearing control faces on opposing sides of the bearing cap forming a maximum bearing cap width, and the bearing cap extending perpendicular to a balancer shaft; and
the balancer shaft configured to rotate within the bearing, wherein the balancer shaft comprises first and second components arranged on opposing sides of the bearing control faces at a width greater than the maximum bearing cap width.

11. The balancer shaft assembly according to claim 10, wherein one of the bearing control faces comes into sliding contact with the first or second component when an axial force acts on the balancer shaft and includes a chamfer on an interior edge.

12. The balancer shaft assembly according to claim 10, wherein the bearing control faces are in direct sliding contact with first and second component control faces.

13. The balancer shaft assembly according to claim 12, wherein the bearing includes a bearing shell positioned between the bearing cap and the balancer shaft and the bearing shell comprises a protrusion shaped to fit within a corresponding slot in the bearing cap.

14. A balancer shaft assembly for an internal combustion engine comprising:
a bearing including a bearing cap connected to a single bearing seat, wherein the bearing cap includes bearing control faces on opposing sides of the bearing cap extending perpendicular to a balancer shaft defining a maximum width of the bearing cap in an axial direction of the balancer shaft; and
the balancer shaft configured to rotate within the bearing, the balancer shaft including a component with a component control face extending perpendicular to the balancer shaft; wherein the component control face and the bearing control face come into contact when an axial force acts on the balancer shaft.

15. The balancer shaft assembly according to claim 14, further including a second component having a second component control face extending perpendicular to the balancer shaft.

16. The balancer shaft assembly according to claim 15, wherein no elements are positioned between the bearing control faces and a corresponding first or second component control face.

17. The balancer shaft assembly according to claim 16, wherein a distance between the bearing control faces is greater than a corresponding width of the bearing seat in an axial direction of the balancer shaft.

18. The balancer shaft assembly according to claim 10, wherein the bearing control faces are outermost extents of the bearing cap in an axial direction of the balancer shaft.

19. The balancer shaft assembly according to claim 18, wherein the maximum bearing cap width in the axial direction of the balancer shaft is greater than a width of the bearing seat in the axial direction.

20. The balancer shaft assembly according to claim 1, wherein the terminal faces of the bearing cap form an outermost extent of the bearing cap in an axial direction of the balancer shaft.

\* \* \* \* \*